(12) United States Patent
Wu et al.

(10) Patent No.: US 8,007,128 B2
(45) Date of Patent: Aug. 30, 2011

(54) LIGHTING DEVICE HAVING LED LIGHT BARS

(75) Inventors: Ting-Feng Wu, Niaosong Hsiang (TW);
Chun-Hung Lin, Pingtung (TW);
Chih-Hung Tseng, Neipu Hsiang (TW)

(73) Assignee: Anteya Technology Corporation (TW)

( * ) Notice: Subject to any disclaimer, the term of this patent is extended or adjusted under 35 U.S.C. 154(b) by 281 days.

(21) Appl. No.: 12/206,652

(22) Filed: Sep. 8, 2008

(65) Prior Publication Data

US 2009/0185374 A1   Jul. 23, 2009

(30) Foreign Application Priority Data

Sep. 14, 2007  (TW) .............................. 96134655 A
Aug. 15, 2008  (TW) .............................. 97131093 A (51) Int. Cl.
*F21S 4/00*     (2006.01)
*F21V 21/00*    (2006.01)

(52) U.S. Cl. .................. 362/249.02; 362/218; 362/294; 362/311.02; 362/800

(58) Field of Classification Search ................. 362/97.3, 362/218, 225, 249.02–249.06, 311.02, 545, 362/612, 800, 294
See application file for complete search history.

(56) References Cited

U.S. PATENT DOCUMENTS

7,329,030 B1 * 2/2008 Wang ............................ 362/373
* cited by examiner

*Primary Examiner* — Jason Moon Han
(74) *Attorney, Agent, or Firm* — Hershkovitz & Associates, LLC; Abraham Hershkovitz (57) ABSTRACT

A lighting device has a light-bar mount and multiple light bars. The light-bar mount is integrally formed from a board. The light bars are mounted on the light-bar mount and each light bar has a heat sink, a circuit board and multiple high-power LED modules. The heat sink is detachably mounted in the light-bar mount. The circuit board is mounted in the heat sink. The high-power LED modules are mounted on the heat sink and electrically connected to the circuit board for providing outward illumination.

5 Claims, 11 Drawing Sheets

FIG.11
PRIOR ART

LIGHTING DEVICE HAVING LED LIGHT BARS

BACKGROUND OF THE INVENTION

1. Field of the Invention

The present invention relates to a lighting device, especially to a lighting device having multiple LED light bars.

2. Description of the Related Art

In recent years, lighting devices generally use incandescent bulbs or high-power LEDs as light sources. Conventional incandescent bulbs are gradually being replaced in many applications by LED light source because incandescent bulbs have disadvantages of high power consumption, low luminous efficiency, and being renewed frequently due to a short life span. Compared with the conventional incandescent bulbs, LEDs offer advantages of high efficiency, low power consumption and a relatively long lifetime.

Figure 11:
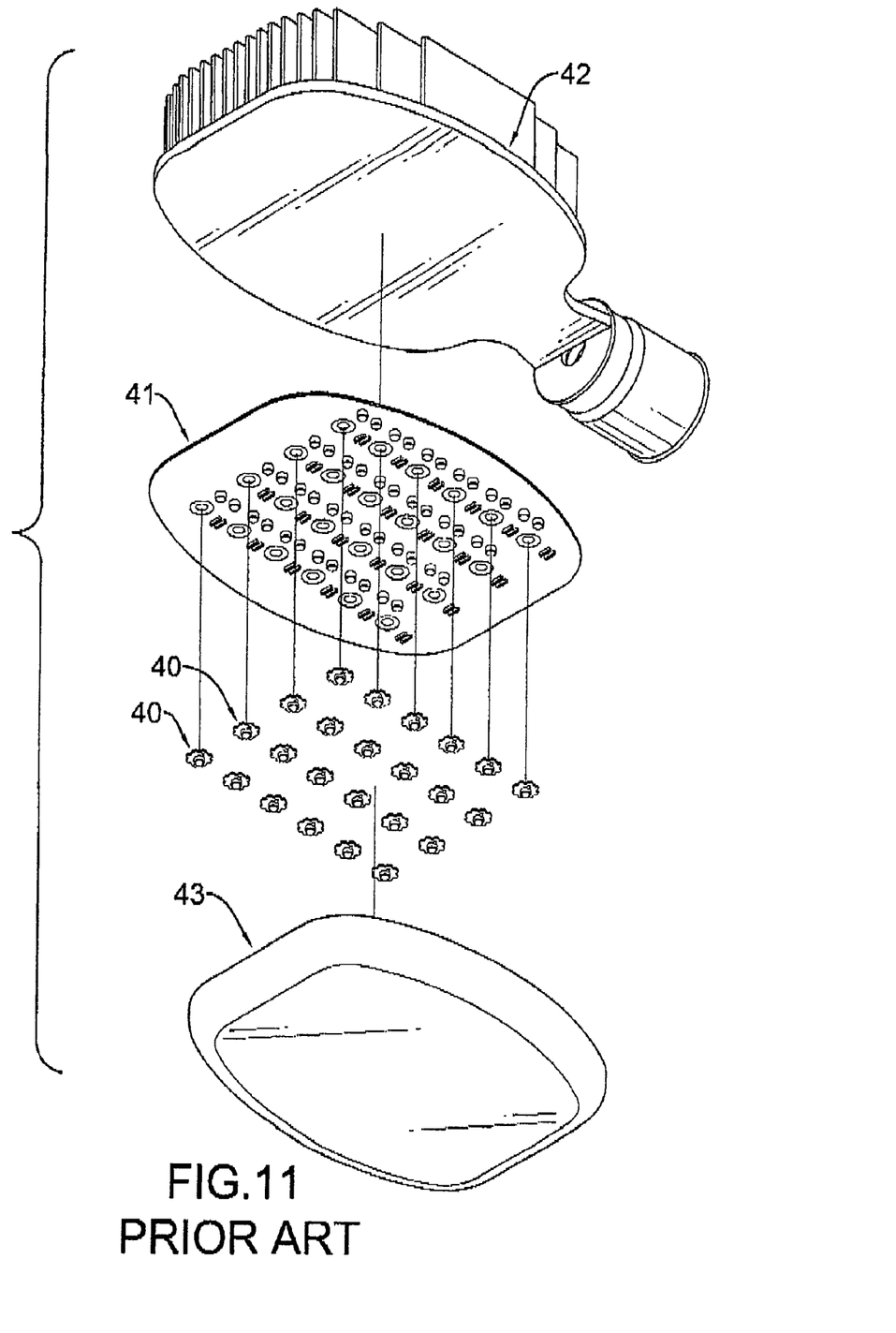
FIG. 11 is an exploded perspective view of a conventional lighting device in accordance with the prior art.

With reference to FIG. 11, a conventional LED lighting device applied as a streetlight may have a heat-dissipating base (42), an aluminum circuit board (41), multiple high-power LED modules (40) and a cover (43). The heat-dissipating base (42) has multiple fins. The aluminum circuit board (41) is attached to a plane surface of the heat-dissipating base (42). The high-power LED modules (40) are electrically mounted on the aluminum circuit board (41) by soldering. The cover (43) is mounted on the heat-dissipating base (42) and covers the high-power LED modules (40). When applying to be a streetlight, the conventional LED lighting device is adapted to be mounted on a top end of a streetlight post to provide illumination on a street at night. When the conventional LED lighting device is turned on, the high-power LED modules (40) generate heat and the heat will be conducted to the heat-dissipating base (42) for dissipation.

Although the foregoing conventional LED lighting device can provide illumination to streets, the LED lighting device still has some shortcomings:

1. Not easy to repair: since the high-power LED modules are soldered on the aluminum circuit board, when one of the high-power LED modules fails, a normal person cannot only change the broken one with simple tool such as a solder, but need a professional technician to disconnect the aluminum circuit board, and then sends the whole aluminum circuit board with the high-power LED modules or the full set of streetlight back to the factory for fixing. Therefore, the cost of repair is very high.

2. Low heat-dissipation efficiency: A large amount of high-power LED modules is required in a conventional LED lighting device, such as a streetlight, to provide sufficient lights. However, large amounts of heat are produced when activating high-power LED modules. When all the heats from each module are conducted to the heat-dissipating base, it will double the heat accumulating and cause heavy loading for the heat-dissipating base.

Due to consideration of installing the LED lighting device in a high position, the aluminum circuit board and the heat-dissipating base are normally limited in size and weight. With such limitation, the LED lighting device is hard to effectively dissipating heat when the heat-dissipation base was not well designed. Therefore, operating the high-power LED modules in high temperature without effective heat dissipation may eventually lead to device failure and may also result in over-heating of other electronic components on the circuit board and shortening of their life spans.

3. Limited illumination area: The conventional LED lighting device provides a substantial round-shaped illumination area. The luminous intensity of the round-shaped illumination area decreases as leaving the center of the illumination area. To meet requirements of a street illumination when being applied as a streetlight, an oval-shaped illumination area is required. Therefore, the aluminum circuit board and the heat-dissipating base all have to be changed in structure. Designing the structure to meet different kinds of illumination-area may require a lot of different molds and high cost.

To overcome the shortcomings, the present invention provides a lighting device to mitigate or obviate the aforementioned problems.

SUMMARY OF THE INVENTION

The main objective of the invention is to provide an LED light bar type lighting device that is easy to repair, effectively dissipates heat and easy to vary illumination area.

The lighting device in accordance with the present invention comprises a light-bar mount and multiple light bars.

The light-bar mount is integrally formed from a board.

The light bars are mounted on the light-bar mount and each light bar has a heat sink, a circuit board and multiple high-power LED modules. The heat sink is detachably mounted in the light-bar mount. The circuit board is mounted in the heat sink. The high-power LED modules are mounted on the heat sink and electrically connected to the circuit board for providing outward illumination.

The lighting device has following advantages:

1. Easy to repair: Each light bar is detachably mounted on the light-bar mount. With the module design, it can reduce the weight, save material cost and easy to install. Technicians only need to change a broken one of the light bars without dismount the whole light-bar mount. Therefore, the cost of repair is low.

2. Independent heat-dissipating structure: Each light bar has a respective heat sink and high-power LED modules are mounted on the heat sink. Therefore each light bar uses a single heat-dissipating structure and can dissipate heat more effectively. This design can prevent the high-power LED modules from over-heating in high temperature and thus has a long lifetime. With the independent module heat-dissipating structure, the main device has flexible shape design without needing of considering the heat-dissipating issue.

Another objective of the invention is to provide a lighting device that is easy to vary illumination area. The light-bar mount of the lighting device is integrally formed by a board being bent into multiple portions including a plane portion and at least one oblique portion being formed on and extending from an edge of the plane portion. The oblique portion has a slope relative to the plane portion. The light bars are respectively mounted on the plane portion and the at least on oblique portion. High-power LED modules mounted on the light bars are substantially arranged in a matrix. With the design of the different slopes of oblique portions, the lighting device can provide a relative wide, even, oval-shaped illumination area to meet requirements of being a streetlight. The high-power LED modules arranged in a matrix can perform a great visual effect when lighting.

Another yet objective of the invention is to provide a lighting device having at least one ornamental light bar to produce colorful lighting effect. In addition to basic illuminations, the lighting device decorates the urban area at night for purpose of landscape when being applied as a streetlight.

Another yet objective of the invention is to provide a lighting device having at least one ornamental light bar with a control circuit board and at least one multi-color high-power LED module. The control circuit board takes frequency of a utility AC power source as a synchronous signal for all ornamental light bars. The frequency is sensed by an AC frequency sampling circuit and the multi-color type high-power LED module is activated to achieve a simultaneous color changing effect for a long time.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
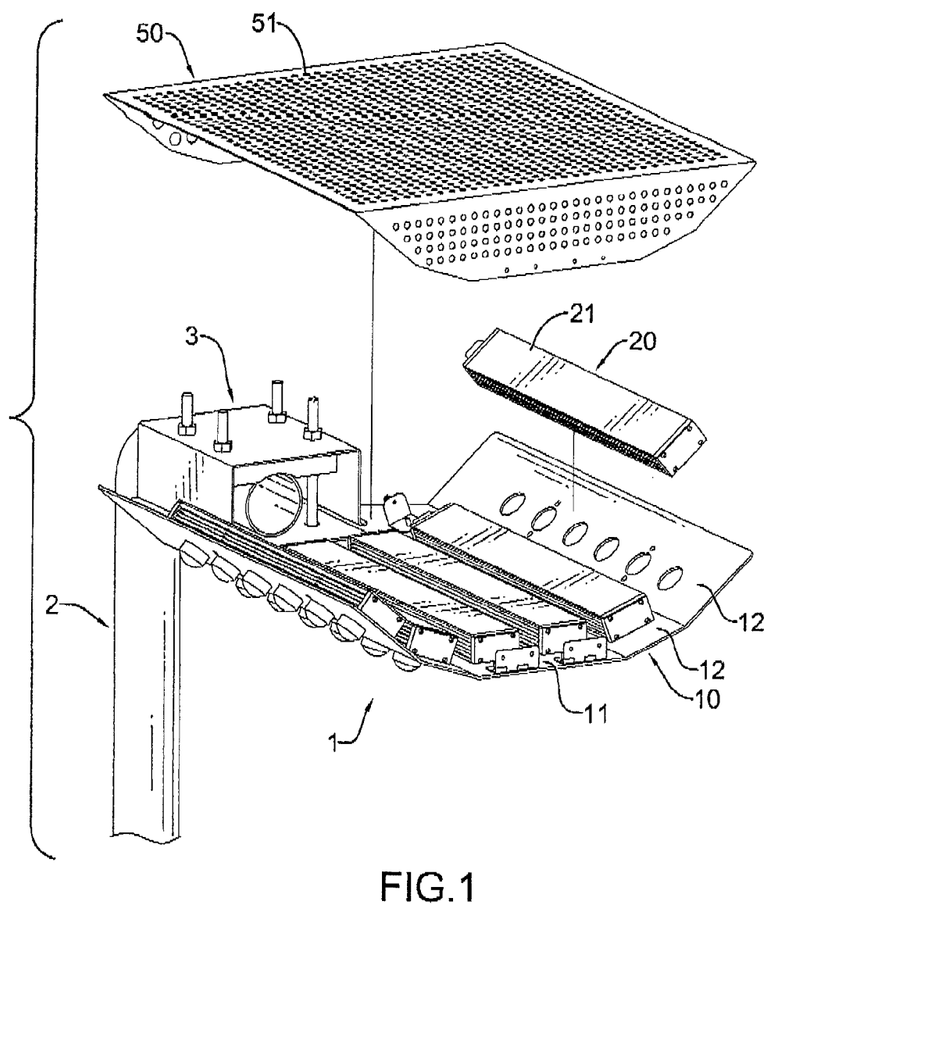
FIG. 1 is a partially exploded perspective view of a first embodiment of a lighting device in accordance with the present invention being attached to a post.
Figure 2:
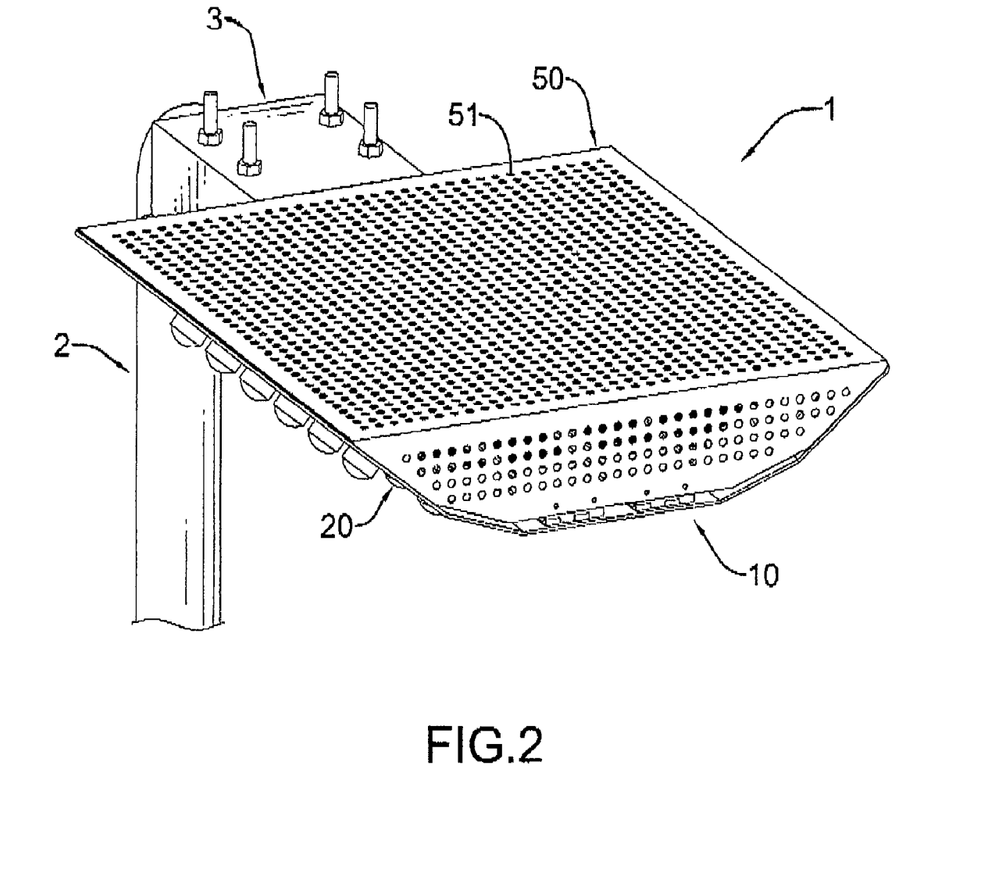
FIG. 2 is a perspective view of the lighting device being attached to a post us shown in FIG. 1.
Figure 3:
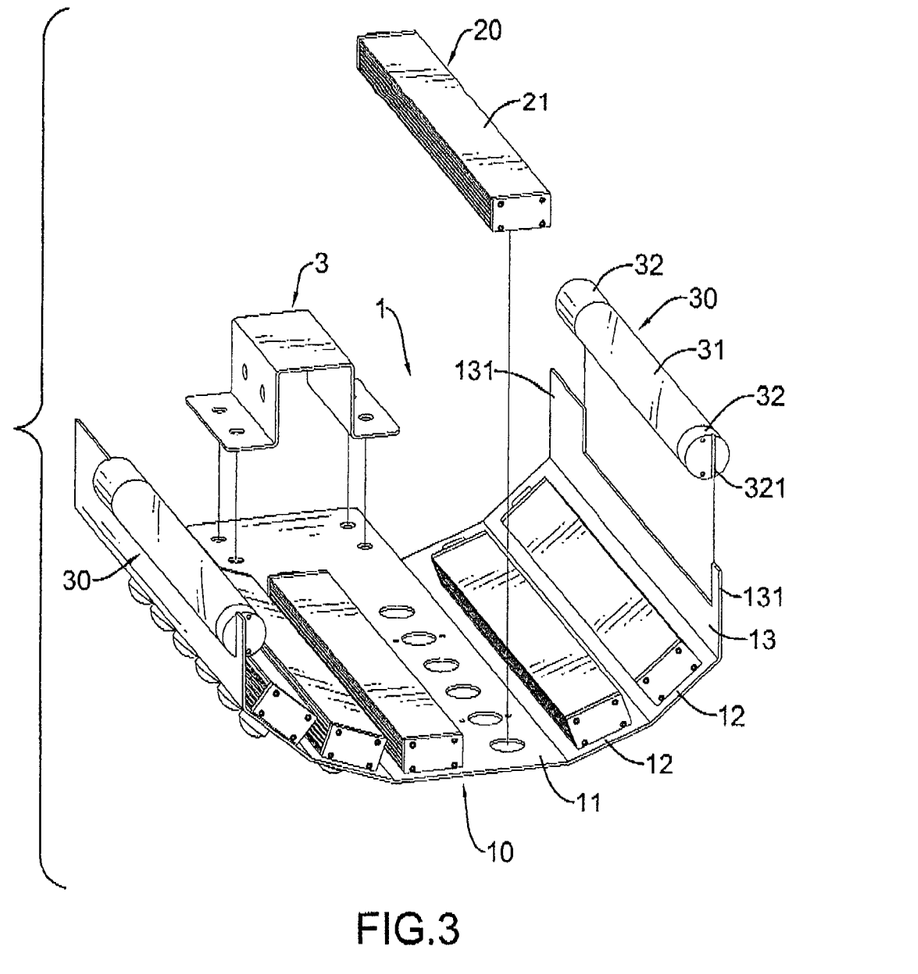
FIG. 3 is a partially exploded perspective view of a second embodiment of a lighting device.

With reference to FIGS. 1 to 3, a lighting device (1) in accordance with the present invention comprises a light-bar mount (10) and multiple light bars (20) and may further include at least one ornamental light bar (30) as in FIG. 3 and a cover (50) as in FIGS. 1 and 2.

The light-bar mount (10) is integrally formed from a board and may be implement as a flat board or a board being bent into multiple portions. Preferably the light-bar mount (10) is integrally bent to have a plane portion (11), at least one oblique portion (12), two optional upstanding portions (13) and multiple optional mounting holes as shown in FIG. 3. The at least one oblique portion (12) is formed on and extends from an edge of the plane portion (11) and may be flat or arched. Preferably multiple oblique portions (12) are implemented and integrally extend from two opposite edges of the plane portion (11) sequentially and have two opposite outermost edges. Each of the oblique portions (12) has a slope relative to the plane portion (11) wherein the farther the distance from the oblique portion (12) to the plane portion (11) is, the larger the slope of the oblique portion (12) is. The mounting holes are formed through each of the plane and oblique portions (1, 12) for mounting the light bars (20).

The upstanding portions (13) are respectively formed on and extend upward from the opposite outermost edges of the oblique portions (12). Each upstanding portion (13) has a mounting portion (131) being formed on a free edge of the upstanding portion (13). In this way, the at least one ornamental light bar (30) can be install into the mounting portion (131) of the upstanding portion (13).

Figure 4:
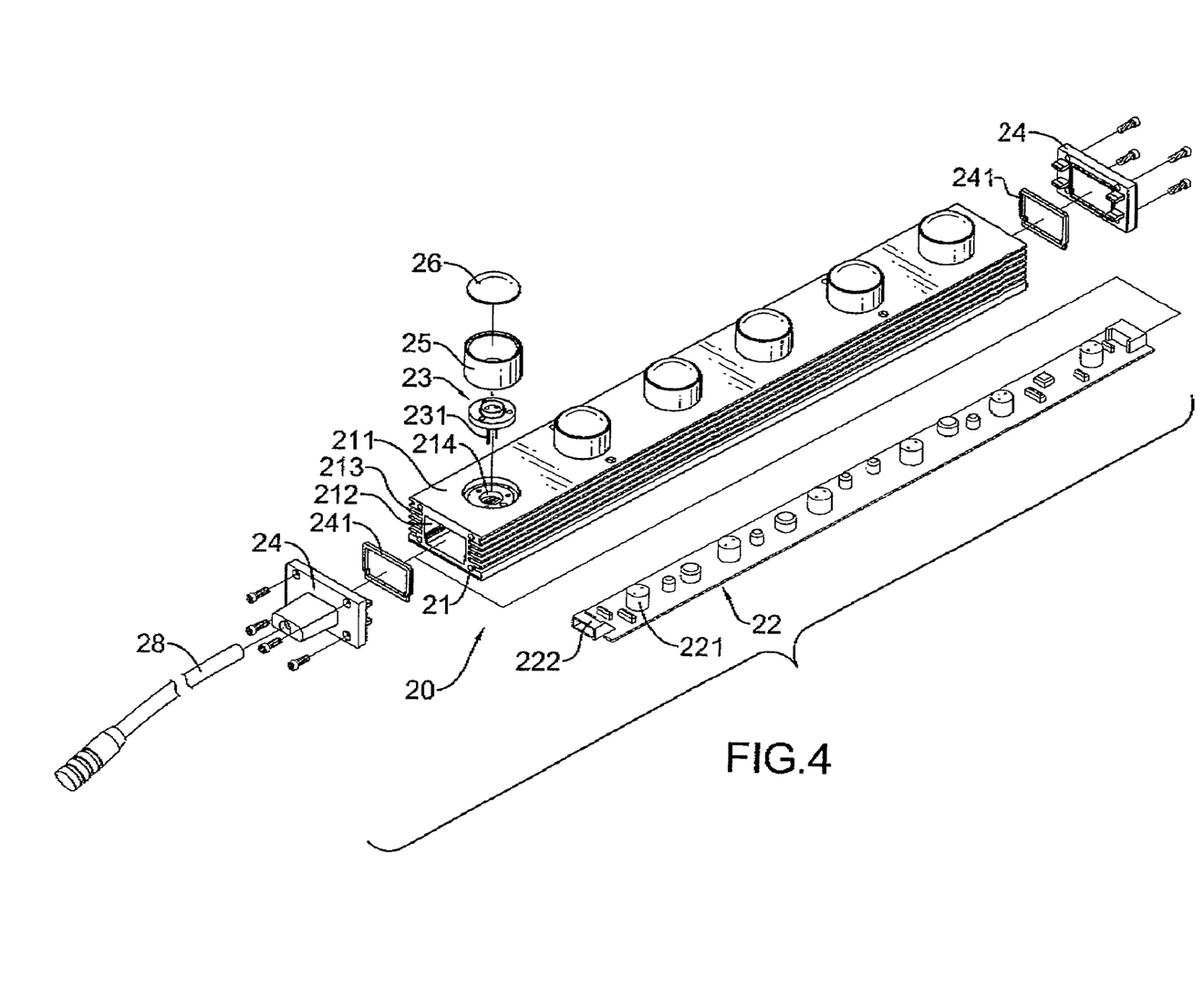
FIG. 4 is a partially exploded perspective view of a first embodiment of a light bar of the lighting device.

With further reference to FIG. 4, the light bars (20) are detachably mounted on the light-bar mount (10) and may be respectively mounted on the plane portion (11) and the at least one oblique portion (12) through the mounting holes of the light-bar mount (10). Each light bar (20) comprises a heat sink (21), a circuit board (22), multiple high-power LED modules (23) and may have two side lids (24), multiple reflection lampshade (25), multiple transparent members (26) and a wire (28).

The heat sink (21) is hollow, made of heat-conductive material and detachably mounted on the light-bar mount (10). The heat sink (21) may have an emission surface (211), at least one side surface, a space (212), two side openings, multiple fins (213) and multiple through holes (214). The space (212) is defined in the heat sink (21). The side openings are respectively formed on two ends of the heat sink (21) and communicate with the space (212). The fins (213) are formed on the at least one side surface of the heat sink (21). The through holes are formed through the emission surface (211) and communicate with the space (212).

The circuit board (22) is mounted in the space (212) of the heat sink (21) and may have at least one electrical connector (221) and at least one terminal (222). The at least one electrical connector (221) is mounted on a top surface of the circuit board (22) and corresponds to one of the through holes (214) of the heat sink (20). The at least one terminal (222) is mounted on an end of the circuit board (20) and is connected to a wire (28). The wire (28) is adapted to connect a utility AC power source.

The high-power LED modules (23) are mounted on the emission surface (211) of the heat sink (20) and electrically connected to the circuit board (22) for providing outward illumination. Each high-power LED module (23) may have a pair of pins (231) extending into a corresponding through holes (214) of the heat sink (20) and detachably connecting to one of the at least one electrical connector (221) on the circuit board (22). As the light bars (20) are respectively mounted on the plane portion (11) and the at least on oblique portion (12), the high-power LED modules (23) of the light bars may be arranged in a matrix form.

The side lids (24) are respectively mounted on the side openings of the heat sink (20) with a waterproof washer (241).

The reflection lampshades (25) are mounted on the emission surface (211) of the heat sink (21) and respectively surround a corresponding high-power LED module (23).

The transparent members (26) are mounted on a top of a corresponding reflection lampshade (25). Each transparent member (26) is selected from any one of the group consisting of a plane lens, a convex lens and a concave lens.

The at least one ornamental light bar (30) is mounted on the light-bar mount (10) and preferably two ornamental light bars (30) are implemented and may be respectively mounted on the mounting portions (131) of the upstanding portions (13) of the light-bar mount (10).

Figure 5:
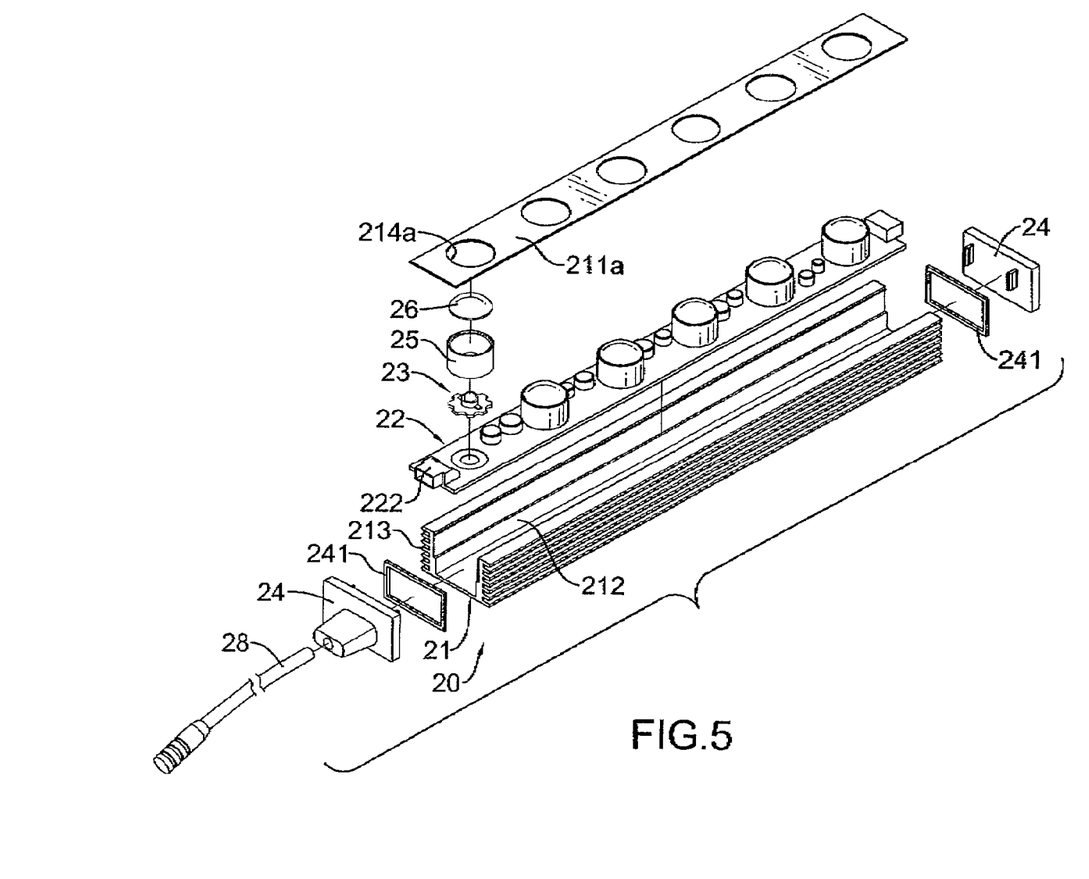
FIG. 5 is a partially exploded perspective view of a second embodiment of a light bar of the lighting device.

With further reference to FIG. 5, in another embodiment of the present invention, the heat sink (21) may have at least one side surface, a top opening, a space (212), two side openings and multiple fins (213). The top opening is formed on a top of the heat sink (21). The space (212) is defined in the heat sink (21) and communicating with the top opening. The side openings are respectively formed on two ends of the heat sink (21) and communicate with the space (212). The fins (213) are formed on the at least one side surface of the heat sink (21). In this embodiment, each light bar (20) further has a mounting plate (211a) being detachably mounted on the top opening of the heat sink (21) and having multiple though holes (214a). The circuit board (22), as shown in FIG. 5, is heat-conductive, mounted in the space of the heat sink (21) and has at least one terminal (222) being mounted on an end of the circuit board (22) and being connected to a wire (28). The wire (28) is adapted to connect to a utility AC power source. Furthermore, each high-power LED module (23) is mounted on the circuit board (22) by soldering and emits light through a corresponding through hole (214a). The reflection lampshades (25) are mounted on the circuit board (22) and respectively surround a corresponding high-power LED module (23).

Since each light bar (20) is detachably mounted on the light-bar mount (10), technicians only need to change a broken one of the light bars (20) without disconnect the whole light-bar mount (10) from the lighting device (1). Therefore the lighting device (1) is easy to repair.

Figure 6:
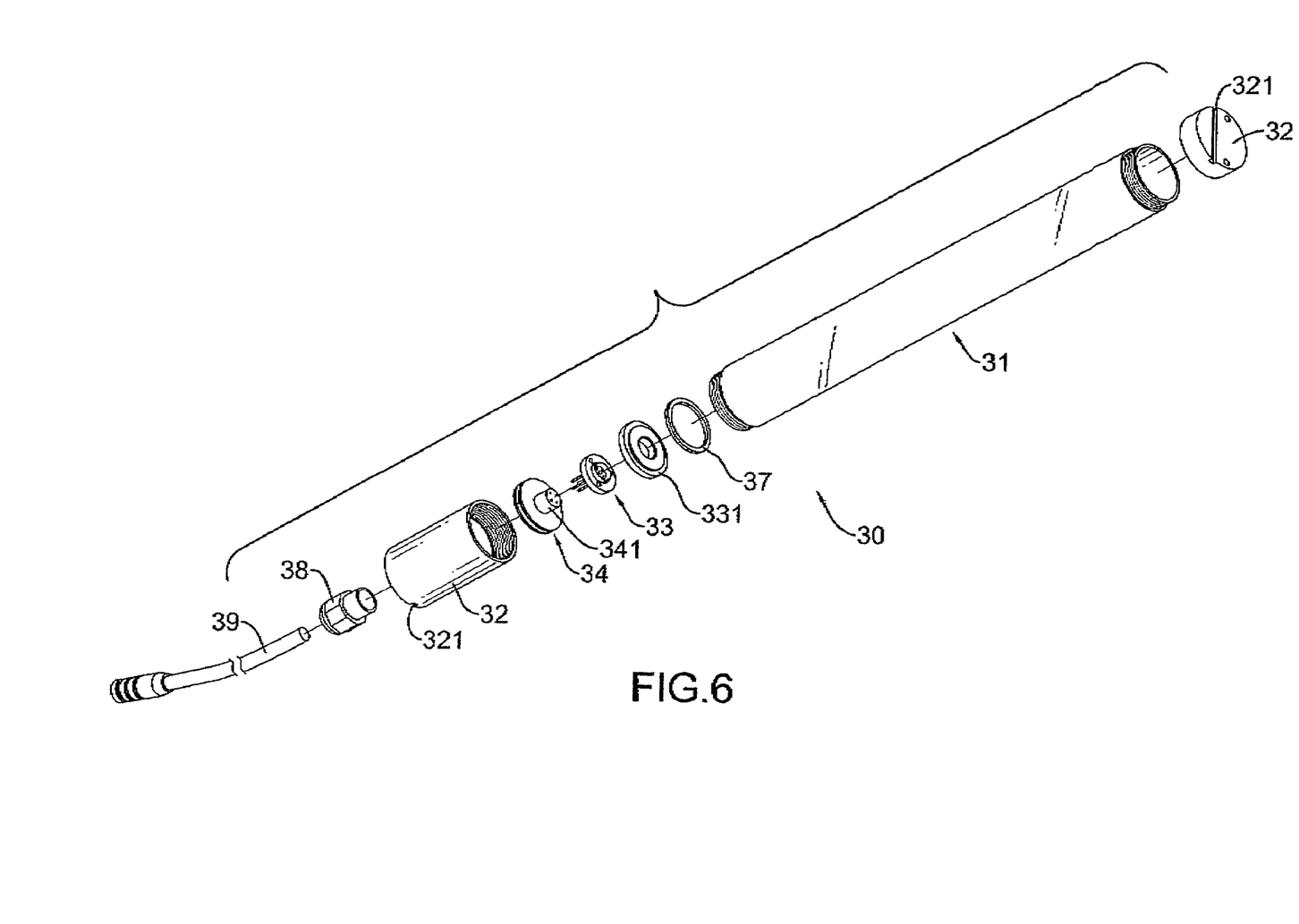
FIG. 6 is an exploded perspective view of an ornamental light bar of the lighting device shown in FIG. 3.

With further reference to FIG. 6, each of the ornamental light bars (30) has a light guide (31), a high-power LED module (33), a control circuit board (34) with multiple build-in control modes and two lids (32).

The light guide (31) has a front end and a rear end and is made of transparent or translucent material such as acrylic and may be column-shaped or a bar-shaped or the like. The light guide (31) may be filled with diffusers being selected from any one of the group consisting of bubbles, light filaments, diffusion compound and diffusion powder.

The high-power LED module (33) of the ornamental light bar (30) is mounted on the front end of the light guide (31), has at least one LED and a pair of pins and may be a monochrome LED module or a multi-color LED module. When being a multi-color type, the high-power LED module (33) has multiple LEDs that respectively emit visible lights of different wavelengths and may be controlled to provide lights of various colors for decoration.

The control circuit board (34) of the ornamental light bar (30) is electrically connected to the high-power LED module (33) and may have an electrical connector (341) for connecting to the pins of the high-power LED module (33).

The lids (32) of the ornamental light bar (30) are respectively mounted around or screwed on the front end and the rear end of the light guide (31) or other fastening means. Each lid (32) may have an outer surface and a slot (321). The slot (321) is formed on the outer surface of the lid (32) to engage with the mounting portion (131) of the light-bar mount (10). Therefore each of the ornamental light bars (30) is capable of being mounted on the mounting portion (131) of the upstanding portion (13) by attaching the lids (32) to the mounting portion (131). One of the lids (32) is mounted on the front end of the light guide (31) with a waterproof washer (331) and securely covers the high-power LED module (33) and the control circuit board (34).

The ornamental light bar (30) may further have a wire (39) being adapted to connect to a power source. The wire (39) is connected to the control circuit board (34) by extending through a waterproof faucet (38) and one of the lids (32).

Figure 7:
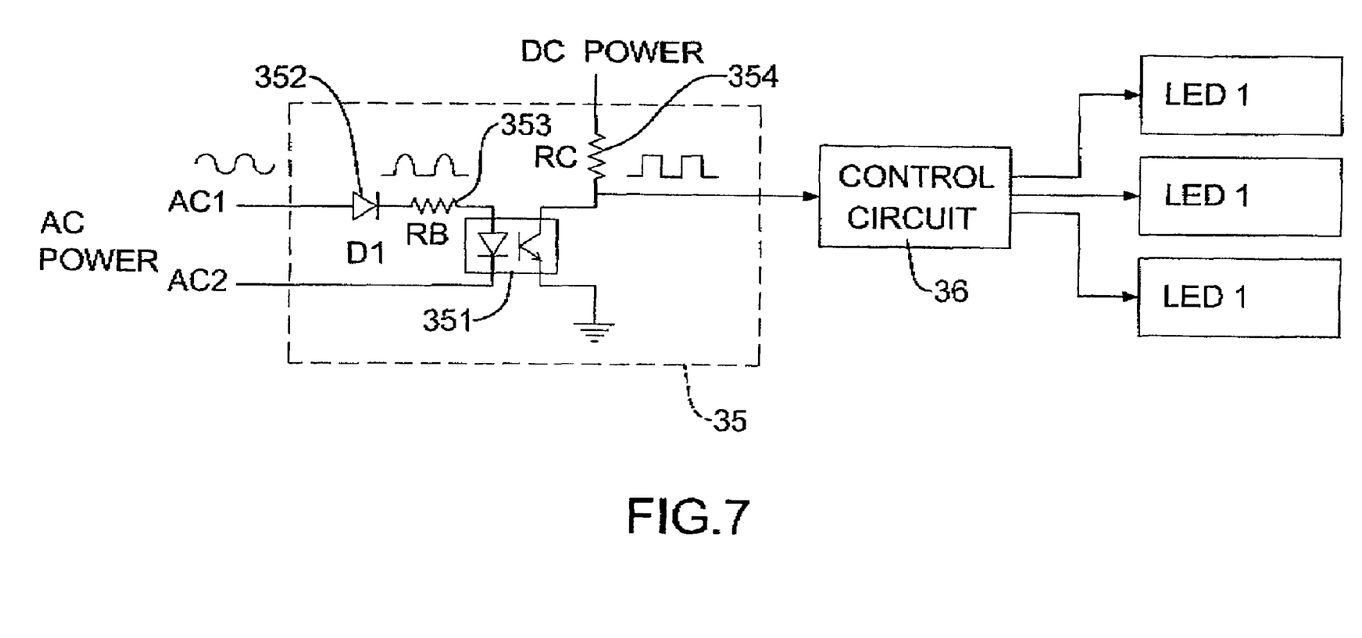
FIG. 7 is a circuit block diagram of an embodiment of the ornamental light bar in FIG. 6.

With further reference to FIG. 7, when the high-power LED module (33) is a multi-color LED module, the control circuit board (34) of the ornamental light bar (30) may have an AC frequency sampling circuit (35) and a control circuit (36).

The AC frequency sampling circuit (35) has an input and output. The AC frequency sampling circuit (35) is adapted to connect to a utility AC power source to sense frequency of the utility AC power source. The output sends continuous pulse signals based on the sensed frequency.

The control circuit (36) with multiple build-in control modes connects to the output of the AC frequency sampling circuit (35) to receive the continuous pulse signals. The control circuit (36) then synchronizes in frequency with the utility AC power source according to the continuous pulse signals and generates a control signal to control display color and brightness of the high-power LED module (33) based on the control modes.

The AC frequency sampling circuit (35) mainly comprises an optical coupler (351). The optical coupler (351) has a light emitting diode and a phototransistor. The light emitting diode is connected to a rectifier diode (352) and a current-limiting resistor (353) in series. The phototransistor is connected between ground and an output resistor (354) that is connected to a DC power. AC power is rectified into a half wave and then activates the light emitting diode of the optical coupler (351). The phototransistor then alternatively turns on and off, and generates periodic continuous pulse signals to the output resistor (354). Since the ornamental light bar (30) is connected to a utility AC power source that maintains the same frequency with a region, such as 50 Hz or 60 Hz, the frequency can be used as a synchronous signal for each ornamental light bar (30) to achieve a simultaneous color changing effect.

The cover (50) is mounted on the light-bar mount (10), covers the light bars (20) and may further cover the ornamental light bar (30) as shown in FIG. 3 and may have multiple ventilation holes formed through the cover (50) to enhance heat-dissipation.

Figure 8:
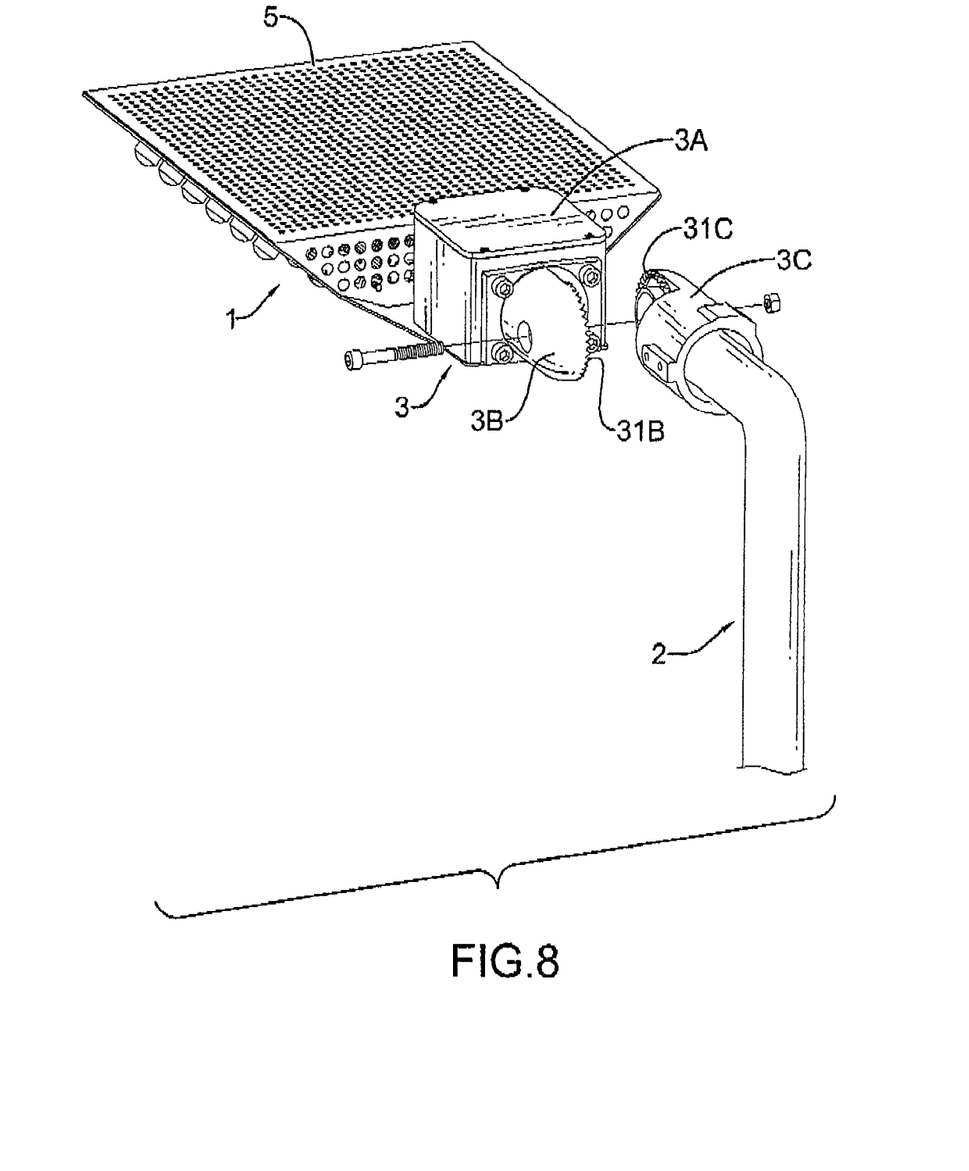
FIG. 8 is a partially exploded perspective view of an embodiment of a post bracket of the lighting device.
Figure 9:
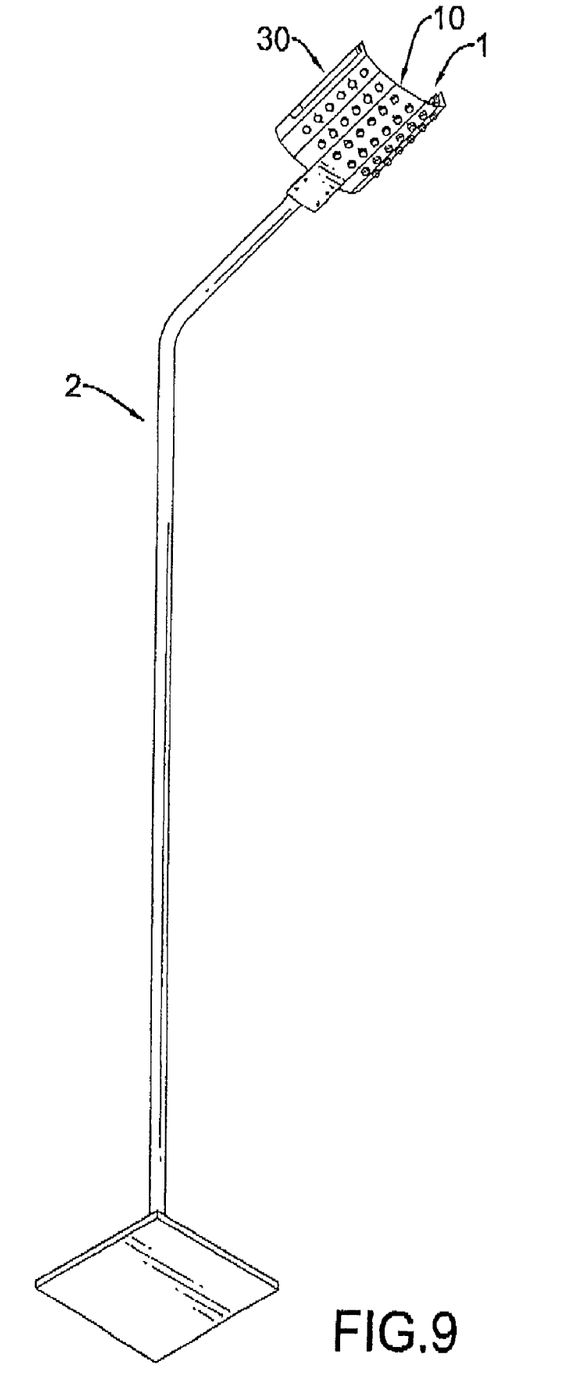
FIG. 9 is a perspective view of the lighting device showing combination with a post.

The lighting device (1) may be mounted on a top of a post (2) by attaching the light-bar mount (10) to the post (2) as shown in FIG. 9 or with a post bracket (3) as shown in FIG. 8. The post (2) is hollow and allows wires (28, 39) being connected to the light bars (20) and the ornamental light bars (30) to extend into the post (2) and connect to a utility AC power source.

With further reference to FIG. 8, the post bracket (3) may be adjustable by having a base (3A), a first adjusting member (3B) and a second adjusting member (3C). The base (3A) is mounted on the light-bar mount (10) by nuts and bolts. The first adjusting member (3B) is mounted on a side surface of the base (3A) and has multiple teeth. The second adjusting member (3C) is securely attached to the first adjusting member (3B) by a screw and has multiple teeth corresponding to the teeth of the first adjusting member (3B). The teeth of the second adjusting member (3C) adjustably mesh with the teeth of the first adjusting member (3B). Inclined angle of the light-bar mount (10) can be adjusted to change the lighting angle of the lighting device by changing the meshing positions between the teeth of the adjusting member (3B, 3C).

Figure 10:
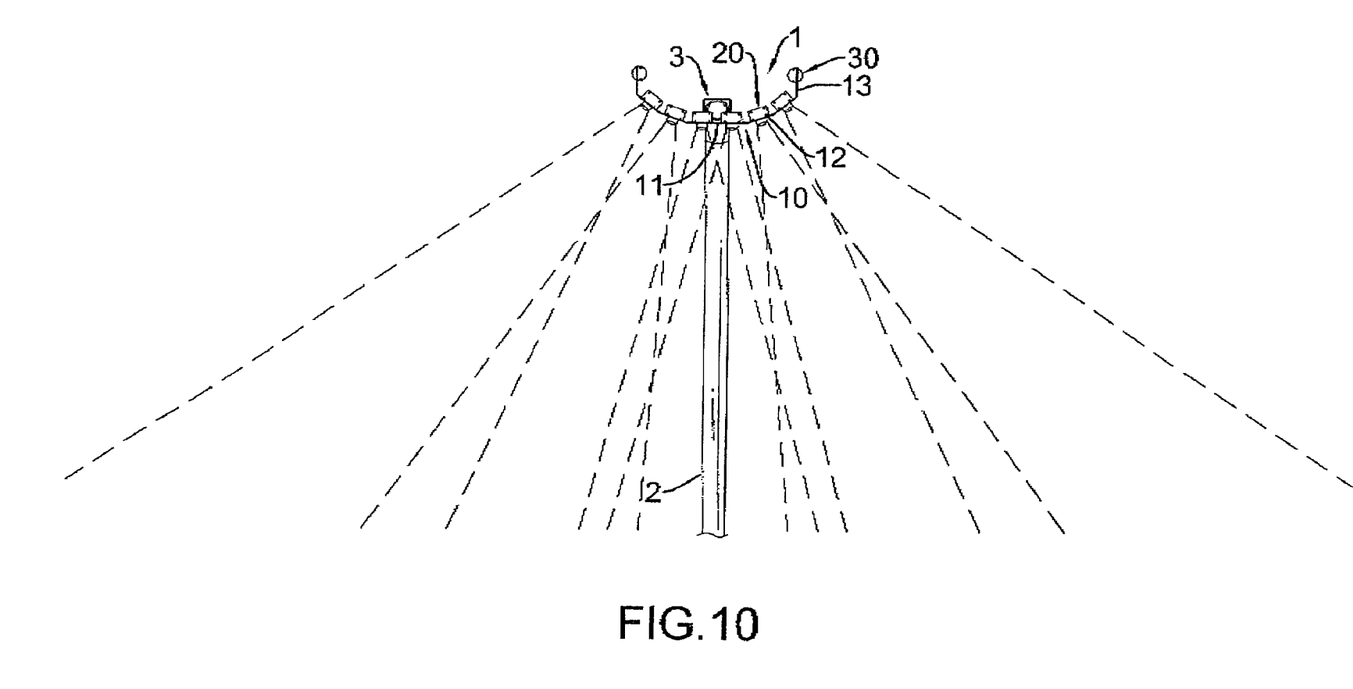
FIG. 10 is an operational side view of the lighting device showing a even illumination area.

With further reference to FIG. 10, the light bar (10) mounted on the plane portion (11) of the light-bar mount (10) illuminates a center area right below the lighting device (1). The light bars (10) mounted on the oblique portions (12) adjacent to the plane portions (11) illuminate outer areas beside the center area lighting device (1). The light bars (10) mounted on the outermost oblique portions (12) illuminate outermost areas near the outer areas. Therefore, the lighting device (1) provides an even, oval-shaped illumination area to meet requirements of street illumination. The high-power LED modules (23) arranged in a matrix can perform a great visual effect when lighting.

Furthermore, the high-power LED module (33) in the ornamental light bars (30) can emit color lights of certain wavelengths to the light guide (31) and produce a simultaneous color changing effect by taking the frequency of utility AC power source as a synchronous signal.

The lighting device (1) is easy to be repaired and easy to vary illumination area and each light bar (20) of the lighting device (1) has an independent heat sink (21) for heat-dissipation. The lighting device (1) further provides colorful lights for decoration.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A lighting device comprising:
   a light-bar mount being integrally formed by a board; and
   multiple light bars being mounted on the light-bar mount and each light bar having
      a heat sink being detachably mounted on the light-bar mount and having
         an emission surface;
         at least one side surface;
         a space being defined in the heat sink;
         two side openings being respectively formed on two ends of the heat sink and communicating with the space;
         multiple through holes being formed through the emission surface and communicating with the space; and
         multiple fins being formed on the at least one side surface;
      a circuit board being mounted in the space of the heat sink and having
         at least one electrical connector being mounted on the circuit board and corresponding to one of the through holes of the heat sink; and
         at least one terminal being mounted on an end of the circuit board and being connected to a wire; and
      two side lids being respectively mounted on the side openings with a waterproof washer;
      multiple high-power LED modules being mounted on the emission surface of the heat sink, having a pair of pins extending into the corresponding through holes of the heat sink and detachably connecting to one of the at least one electrical connector on the circuit board for providing outward illumination.

2. The lighting device as claimed in claim 1, wherein
   the light-bar mount is integrally bent to have a plane portion and at least one oblique portion being formed on and extending from an edge of the plane portion and having a slope relative to the plane portion; and
   the light bars are respectively mounted on the plane portion and the at least one oblique portion wherein the high-power LED modules of the light bars are arranged in a matrix form.

3. The lighting device as claimed in claim 1, wherein the lighting device further has a cover being mounted on the light-bar mount and having multiple ventilation holes formed through the cover.

4. The lighting device as claimed in claim 1, wherein the lighting device further has a post bracket being mounted on the light-bar mount for attaching to a post.

5. The lighting device as claimed in claim 1, wherein each light bar further has
   multiple reflection lampshades being mounted on the heat sink and respectively surrounding a corresponding high-power LED module; and
   multiple transparent members being mounted on a top of a corresponding reflection lampshade and each transparent member being selected from any one of the group consisting of a plane lens, a convex lens and a concave lens.

* * * * *